(12) United States Patent
Fedorov

(10) Patent No.: US 7,346,634 B2
(45) Date of Patent: Mar. 18, 2008

(54) APPLICATION CONFIGURATION CHANGE LOG

(75) Inventor: Vladimir D. Fedorov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 10/602,498

(22) Filed: Jun. 23, 2003

(65) Prior Publication Data

US 2004/0260718 A1 Dec. 23, 2004

(51) Int. Cl.
*G06F 12/00* (2006.01)
*G06F 17/00* (2006.01)

(52) U.S. Cl. .................... 707/203; 707/204; 700/83

(58) Field of Classification Search ............ 707/1–206; 713/1–601; 714/1–824; 715/500–978; 717/100–178
See application file for complete search history.

(56) References Cited

U.S. PATENT DOCUMENTS

| | | | |
|---|---|---|---|
| 5,481,710 A | 1/1996 | Keane et al. ............... | 395/700 |
| 6,108,668 A | 8/2000 | Bates et al. ................ | 707/203 |
| 6,111,575 A | 8/2000 | Martinez et al. ........... | 345/352 |
| 6,161,125 A * | 12/2000 | Traversat et al. ........... | 709/203 |
| 6,185,577 B1 * | 2/2001 | Nainani et al. ............. | 707/202 |
| 6,185,591 B1 | 2/2001 | Baker et al. ................ | 707/531 |
| 6,192,378 B1 | 2/2001 | Abrams et al. ............. | 707/204 |
| 6,195,660 B1 * | 2/2001 | Polnerow et al. ............ | 707/10 |
| 6,449,624 B1 * | 9/2002 | Hammack et al. .......... | 707/203 |
| 6,457,123 B1 * | 9/2002 | Rollins ....................... | 713/100 |
| 6,523,134 B2 | 2/2003 | Korenshtein ................ | 714/16 |
| 6,668,261 B1 * | 12/2003 | Basso et al. ................ | 707/203 |
| 6,721,767 B2 * | 4/2004 | De Meno et al. ........... | 707/204 |
| 6,766,334 B1 * | 7/2004 | Kaler et al. ................. | 707/203 |
| 6,816,873 B2 * | 11/2004 | Cotner et al. ............... | 707/201 |
| 2003/0009752 A1 * | 1/2003 | Gupta ......................... | 717/171 |
| 2004/0088548 A1 * | 5/2004 | Smetters et al. ............ | 713/175 |

OTHER PUBLICATIONS

Styne, Bruce A.; "Command History in a Reversible Painting System"; Computer Animation '90; Apr. 25-27, 1990; Geneva, Switzerland; p. 149-64.

Chii Meng; Yasue, Motohiro; Imamiya, Atsumi; and Xiaoyang Mao; "Visualizing Histories for Selective Undo and Redo,"; Proceedings of the 3rd Asia Pacific Computer Human Interaction; Jul. 15-17, 1998; p. 459-64.

Min Zhang and Kehong Wang; "Implementing Undo/Redo in PDF Studio Using Object-Oriented Design Pattern,"; Proceedings of the 36th International Conference on Technology of Object-Oriented Languages and Systems (TOOLS-Asia 2000); Oct. 30-Nov. 4, 2000; p. 58-64.

(Continued)

*Primary Examiner*—Tim Vo
*Assistant Examiner*—Jay A. Morrison
(74) *Attorney, Agent, or Firm*—Workman Nydegger

(57) ABSTRACT

Systems and methods are provided for undoing, redoing or rolling back a configuration setting change for an application. Application configuration information related to the setting change can be received and stored by a log, wherein a history of the configuration setting changes for the application can be maintained. The system can also display the history of changes made for viewing and selecting. When a user wishes to revert a configuration setting back to a previous one, the user can select the desired setting for reversion and a call to a reversion routine can be made. At least a portion of the application information may then be passed to the reversion routine for reverting to the application's previous configuration setting.

21 Claims, 4 Drawing Sheets

OTHER PUBLICATIONS

Lee, John; Chan, Wai K.; and Sunwoo, J.S.; "The Sun Object for Open Nested Transactions,"; Proceedings of the 16th IASTED International Conference, Applied Informatics; Feb. 23-25, 1998; p. 402-4.

Stevens, Al; "Undo/Redo Redux,"; *Dr. Dobb's Journal*; Nov. 1998; vol. 23, No. 11; p. 119-20, 122, 124-5.

Chunbo Zhou and Imamiya, Atsumi; "Object-Based Nonlinear Undo Model,"; Proceedings of the 21st Annual International Computer Software and Applications Conference (COMPSAC'97); Aug. 13-15, 1997; p. 50-5.

Myers, Brad A.; McDaniel, Richard G.; Miller, Robert C.; Ferrency, Alan S.; Faulring, Andrew; Kyle, Bruce D.; Mickish, Andrew; Klimovitski, Alex; and Doane, Patrick; "The Amulet Environment: New Models for Effective User Interface Software Development,"; *IEEE Transactions on Software Engineering*; Jun. 1997; vol. 23, No. 6; p. 347-65.

Abowd, Gregory D. and Dix, Alan J.; "Giving Undo Attention,"; *Interacting with Computers*; Dec. 1992; vol. 4, No. 3; p. 317-42.

Van Camp, David; "An Unlimited Undo/Redo Stack Pattern for PowerBuilder,"; *Dr. Dobb's Journal*; Jun. 1997; vol. 22; No. 6; p. 78, 80, 82, 84, 86.

Chen, David and Chengzheng Sun; "Undoing Any Operation in Collaborative Graphics Editing Systems,"; Group'01 Proceedings of the 2001 International ACM SIGGROUP Conference on Supporting Group Work; Sep. 30-Oct. 3, 2001; p. 197-206.

Edwards, W. Keith; Igarashi, Takeo; Lamarca, Anthony; and Mynatt, ELizabeth D.; "A Temporal Model for Multi-Level Undo and Redo,"; UIST Proceedings of the 13th Annual ACM Symposium on User Interface Software and Technology; Nov. 5-8, 2000; p. 31-40.

Beveridge, Jim; "Implementing Multilevel Undo/Redo,"; *Dr. Dobb's Journal*; Feb. 1996; vol. 21, No. 2; p. 64-6, 100, 102-4.

Berlage, Thomas and Genau, Andreas; "From Undo to Multi-User Applications,"; Vienna Conference VCHCI'93 Fin de Siecle, Human Computer Interaction; Sep. 20-22, 1993; p. 213-24.

Toriya, Hiroshi; Satoh, Toshiaki; Ueda, Kenji; and Chiyokura, Hiroaki; "Undo and Redo Operations for Solid Modeling,"; *IEEE Computer Graphics and Applications*; Apr. 1986; vol. 6, No. 4; p. 35-42.

Leeman, George B., Jr.; "Building Undo/Redo Operations Into the C Programming Language,"; 15th Annual International Symposium on Fault-Tolerant Computing FTCS 15 Digest Papers; Jun. 19-21, 1985; p. 410-15.

Otto, Harald E.; "Undo, An Aid for Explorative Learning?"; *Journal of Computer Science and Technology* (English Language Edition); Jul. 1992; vol. 7; No. 3; p. 226-36.

Waldhor, Klemens; "Some Theses on Undo/Redo Commands,"; Proceedings of the 2nd IFIP Conference, Human-Computer Interaction—INTERACT'87; Sep. 1-4, 1987; p. 777-81.

Yiya Yang; "Undo Support Models,"; *International Journal of Man-Machine Studies*; May 1988; vol. 28, No. 5; p. 457-481.

\* cited by examiner

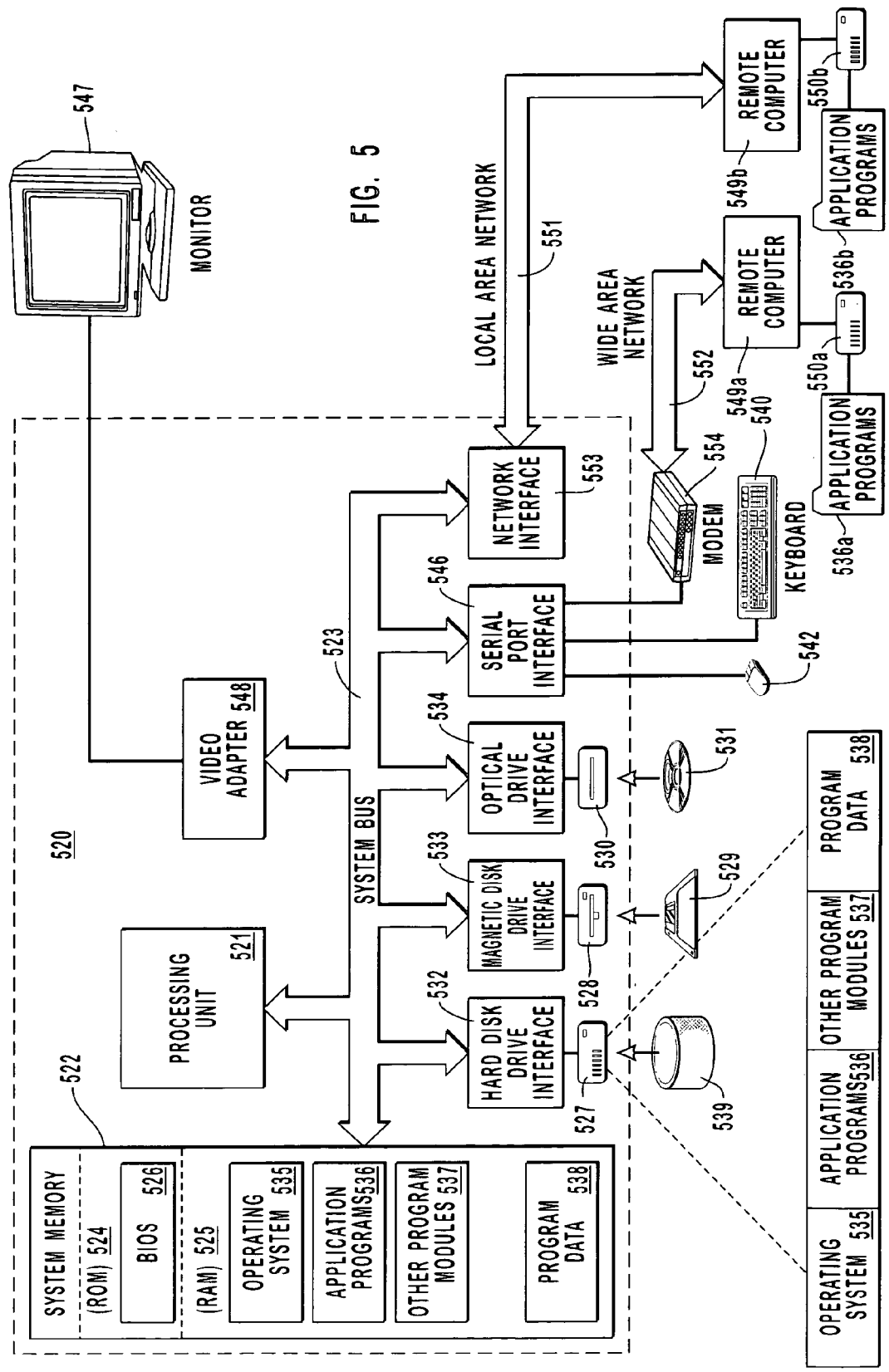

APPLICATION CONFIGURATION CHANGE LOG

CROSS-REFERENCE TO RELATED APPLICATIONS

N/A

BACKGROUND OF THE INVENTION

1. The Field of the Invention

The present invention generally relates to software configuration changes, and in particular to an application configuration change log used in reverting a current configuration setting for an application to a previous configuration setting through, e.g., an undo, redo or rollback operation.

2. Background and Relevant Art

Most software applications have an accompanying configuration file, which describes configuration options particular to that application. These settings control a wide array of operation behaviors for the application. For example, they can dictate the appearance of the application (e.g., the background color used, the font style and size for the menus and toolbars, etc.), the toolbar configuration (e.g., which tool will be listed, the size of the toolbar, etc.), the printer settings (e.g., printer properties such as layout, the number of pages to print, etc.), etc. Moreover, these settings could be for the operation of the overall system, e.g., those settings found in a typical control panel such as the time of day settings, display settings, mouse settings, etc. In other words, the configuration settings describe the overall operation of the application and can be virtually any software setting that can be individually modified to a user's preference.

Configuration information for an application is typically stored in a configuration file, centralized store, e.g., system-wide registry, or both. A configuration file is created for storing configuration information specific to a particular application. A registry on the other hand, can be system-wide with a predefined format; thus, any application program can access the information in the registry. Accordingly, application programs, application setup programs, and the operating system itself can store their own configuration information in such a centralized location. An application program can retrieve, modify and replace configuration information from either the configuration file or registry during execution to control its operation. In addition, typical systems provide a user with access to the configuration information stored in either the configuration file or registry for editing purposes.

Regardless of whether the configuration information is distributed or centrally stored, certain problems in using and managing the information have been recognized. For example, when the user or application makes configuration setting changes the file or registry is typically updated with the new configuration information and the old configuration information is discarded. Accordingly, if the user or application wishes to revert back to the previous settings, they must remember what settings they changed and how they changed them. Often times, however, this is difficult or impossible. For example, a configuration change in application A may cause an undesirable effect in application B; thus, requiring the user to both recognize that the change in A caused the change in B and recall how to change it back. This may be a difficult task, especially if any significant time has elapsed between when the user made the change in A and noticed undesirable effect in B and/or the configuration change was a complex procedure.

Because of the complexity of today's configuration settings and the user's difficulty in recalling changes made, the user often times is leery about experimenting with configuration settings. For example, when a user is presented a dialog box with options for changing configuration settings that they don't understand very well, he/she doesn't feel confident making the selection. Accordingly, the user is less likely to experiment with the options, and may not be getting the optimum performance from the application. Further, the user experiences a great deal of anxiety in using the system and doesn't feel like he/she is in control.

Although current applications provide undo/redo functionality for the data that the application operates on, (e.g., the undo/redo edit for text in a standard text editor), no such functionality currently exists for software configuration settings. Further, once the application is closed this undo/redo application data no longer persists. Accordingly, there exists a need for a system that can maintain a history of software application configuration change information and provide help in undoing, redoing, or rolling back configuration settings. More generally, there exists a need for a system that can provide a reversion routine for changing the configuration of an application to a previous state.

BRIEF SUMMARY OF THE INVENTION

In accordance with exemplary embodiments of the present invention, the above-identified lack of undo/redo functionality for software configuration settings is overcome. For example, exemplary embodiments provide for a computer system and method for reverting a current configuration setting for an application to a previous configuration setting. The system can receive and store application configuration information to be used in reverting to the previous configuration setting. Further, a history of the configuration setting changes for the application can be maintained. The system can also display a representation of the application configuration information for viewing and selecting. When selected, the application configuration information can be retrieved and a call to a reversion routine can be made. At least a portion of the application information may then be passed to the reversion routine for reverting to the application's previous configuration setting.

In accordance with yet another example embodiment, a system and method are provided that allow for maintaining a history of configuration setting changes for an application. Application configuration information can be identified from within the maintained history. Further, the system also provides for reverting to the application's previous configuration setting by using at least a portion of the identified application configuration information.

In accordance with yet another example embodiment, a system is provided that facilitates the reversion of an application's configuration to a previous configuration setting. The system can receive a package of information, which contains application configuration information that can be used in reverting to the previous configuration setting. The package of information can then be stored for subsequent retrieval and for maintaining a history of configuration setting changes for the application. A request from the application for the package of information can be received when reverting to the application's previous configuration setting. Finally, the package of information can be retrieved and sent to the application for processing the application configuration information when reverting to the previous configuration setting.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an example system that provides a suitable operation environment for the present invention.

DETAILED DESCRIPTION OF THE PREFERRED EMBODIMENTS

The present invention extends to methods, systems, and computer program products for reverting a current application configuration setting to a previous configuration setting using a history of configuration changes. The embodiments of the present invention may comprise a special purpose or general-purpose computer including various computer hardware, as discussed in greater detail below.

As mentioned above, most software applications have an accompanying configuration file or configuration registry, which describes the configuration settings particular to that application. These configuration settings describe the overall operation of the application and can be virtually any software setting that may or may not be individually modified to a user's preference. For example, the configuration settings could be used to configure the appearance of the application, the toolbar configuration or the printer settings. Moreover, configuration settings can be used to control the overall performance of the computer system, e.g., display settings, mouse settings, etc. Currently, however, there is no recorded history of changes made to the configuration settings, nor any assistance to undo, redo or rollback configuration settings.

Figure 1:
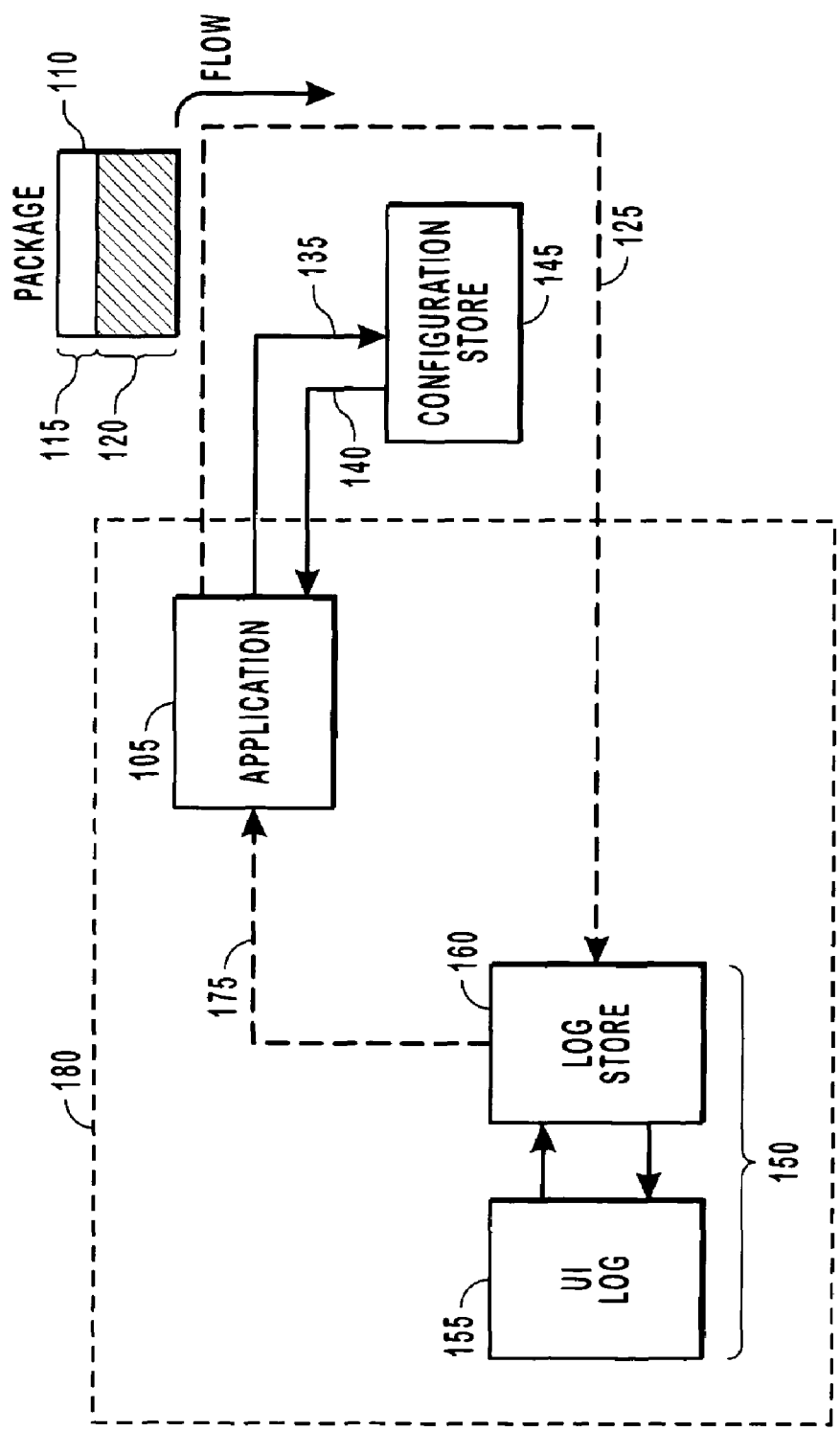
FIG. 1 illustrates the use of a Log for storing configuration change information in accordance with example embodiments of the present invention.

FIG. 1 illustrates the use of a Log 150 for storing configuration change information in accordance with example embodiments of the present invention. Typical of most software applications, Application 105 can maintain configuration information in a Configuration Store 145, which can be retrieved using path 140 when Application 105 is loaded. As changes in the configuration settings for Application 105 are made these changes are recorded and stored in Configuration Store 145 using path 135. As one of ordinary skill in the art would recognize, these changes can be made by the user (not shown) or by the Application 105 to enhance performance and user experience. Further, these changes can be made while Application 105 is executed, or the changes can be made directly to the Configuration Store 145, which could be, e.g., an application file or centralized registry. In accordance with the present invention, however, changes are typically made while Application 105 is executed. Nevertheless, changes to Configuration Store 145 can be made when Application 105 is not being executed. For example, when the configuration settings are shared among several applications (e.g., printer settings), changes to one application may effect changes to all other shared applications or changes may be made directly to the Configuration Store 145 through a Configuration File or Registry Editor (not shown).

In accordance with example embodiments of the present invention, when Application's 105 configuration settings are changed Application 105 not only updates Configuration Store 145 but also sends a Package 110 of application configuration information to Log 150. This Package 110 of information can later be recalled and received back by Application 105 when reverting its configuration settings to previous ones.

Example embodiments also provide that the package 110 may have an XML (eXtensible Mark-up Language) data structure, which has a Header portion 115 and an Application Payload portion 120. The Header 115 of Package 110 may contain information that uniquely identifies the contents of Package 110 and the changes made to configuration settings for Application 105. For example, Header 115 may contain information that identifies the Application 105 where configuration changes were made, a title of the changes that were made, a brief description of the configuration change, and/or the date and time of the configuration change, etc. Further Header 115 of Package 110 may contain a reversion routine, which as described in greater detail below, can be called to assist Application 105 to undo, redo or rollback to a previous configuration setting. The Application Payload portion 120 of Package 110 will typically be binary encoded data, e.g., base 64, that can be passed to the above-identified reversion routine when reverting to an application's previous configuration setting. It should be noted, however, that the information within Application Payload portion 120 can be any type of data used in assisting the user or Application 105 in reverting to a previous configuration setting.

Log 150 is primarily made up of two parts; Store 160 and User Interface (UI) 155. Log Store 160 is primarily used to store Package 110 for subsequent retrieval when reverting to Application's 105 previous configuration setting. It is through the Store 160 that a history of configuration changes is maintained for Application 105. The UI 155 of Log 150 can be used to view and select events of interest from the history. For example, UI Log 155 could be a browser that uses the Header 115 information of Package 110 to display information that uniquely identifies changes made to configuration settings of Application 105. This displayed change information by UI 155 could be, e.g., a Name of Application 105, a Title of the change made (e.g., Printer Properties), a brief Description of the change (e.g., Page Layout), and/or the Date and Time the changes were made (e.g., May 29, 2003 @ 3:05 p.m.).

As one of ordinary skill in the art would recognize, Log 150 can be either partially or entirely embedded with an application. Accordingly, the dotted line 180 around Log 150 and application 105 is used to indicate that either component of the Log 150 may be embedded in Application 105. For example, Application 105 might include code that can generate the UI Log 155, and/or Application 105 may maintain a store that would represent Log Store 160. Alternatively, these Log 150 components (i.e., UI Log 155 and Log Store 160) may be separate from Application 105.

In accordance with example embodiments, a user can view a history of configuration changes made to Application 105 from UI 155 and select a desired change to undo, redo or rollback. As one of ordinary skill in the art would recognize, an undo routine simply undoes a change made to the configuration settings, while redo simply undoes a previous undo operation. Alternatively, a user or Application 105 may wish to rollback configuration changes to a specific date and time. Accordingly, example embodiments provide that a user (or Application 105) can select a particular day and time to revert configuration settings to. Based on the history kept in Log 150 all changes made to configuration settings after that date can be undone. Regardless of the type of reversion made (i.e., undo, redo, or rollback), the reversion routine performed changes the configuration to a previous state. In particular, the following discussion uses the terms "reversion," "reverted" or "reverting" to a previous configuration setting as a generic term in describing any undo, redo or rollback operation.

Once a user or Application 105 has selected a configuration change to be reverted, Log 150 can call a reversion routine in Application 105. Package 110 can then be passed through path 175 back to the routine in Application 105 for reverting to a previous configuration setting. The routine may simply call a "pop-up" help screen, which yields manual instructions on how to revert the configuration change back to the previous setting. Alternatively, the routine may call several other routines to assist in automatically reverting the configuration change. In an alternative embodiment, all of the functionality of the Log, i.e., the selection from the UI 155 and then calling the routine, can be performed by the application. In such case, the Log 150 does not need to know all of the working details of Package 110, but rather facilitates the reversion routine by passing Package 110 back to Application 105 upon request. Application 105 then uses the package of information, through either manual instructions or automatically, to revert to the previous configuration setting.

In accordance with yet another example embodiment, when any reversion routine is called and then passes Package 110 back to Application 105, the Configuration Store 145 may be updated. As such, Application 105 may then send another Package 110 of configuration change information to Log 150. This implementation of the present invention is particularly useful in assisting the redo functionality.

Because the number of events (i.e., configuration changes) can be large, the present invention allows for distinguishing between events that are interesting to the user or Application 105 and those that are not. For example, the present invention can allow the user to select which events to send to Log 150 through e.g., a dialog box which can be checked if the user wishes to send the change he is making to Log 150. Thus, exemplary embodiments provide that Application 105 can automatically send those events that are visible to the user, e.g., change in font size, printer settings, toolbar configuration, etc. Although Log 150 can receive both internal application settings and visible user event settings, typically Log 150 will be given the ability to distinguish internal events and those that are controlled and visible by the user.

In order to combat security concerns (e.g., someone else passing as Log 150 to give Application 105 a package that will corrupt its system or someone posing as Application 105 and sending packages of configuration information to be sent back to Application 105 to corrupt its system) the present invention allows for encryption of Package 110. For example, the present invention allows for Public-key encryption; however, as one of ordinary skill in the art would recognize, any type of security encryption could be used for sending and receiving packages of configuration information.

Figure 2:
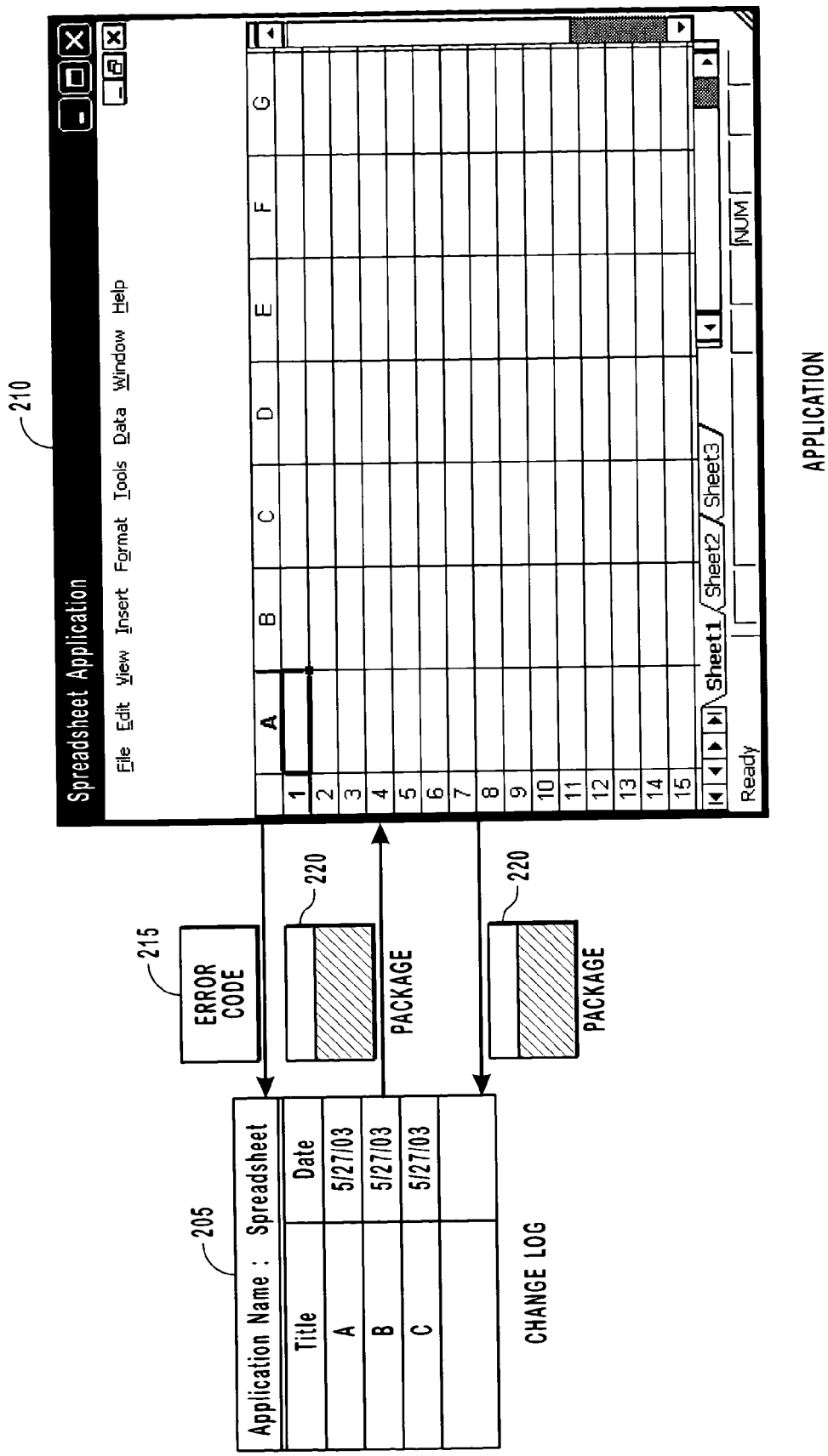
FIG. 2 illustrates the exchange of configuration change information between an application and a change log in accordance with exemplary embodiments of the present invention.

FIG. 2 further illustrates the exchange of a Package 220 of configuration change information between an Application 210 and a Change Log 205 in accordance with example embodiments of the present invention. Change Log 205 may contain a filter for displaying the results of a query on a per application or per time period basis. As shown in FIG. 2, for example, Change Log 205 displays configuration change information such as an application Name, a change Title, and a change Date. The Title and Date and other change configuration information may be displayed in a grid-like fashion of rows and columns showing a history of changes that have been made to a particular application. Alternatively, the display may show changes sequentially or chronologically rather than on an application-specific basis. As one of ordinary skill in the art would recognize, however, any suitable form of displaying the configuration change information for viewing and selecting is applicable to the present invention.

When a configuration change is made to Application 210, Package 220 of information describing these changes is sent to Change Log 205. Change Log 205 stores the Package 220 to maintain a history of configuration setting changes for Application 210. In an example embodiment, Change Log 205 has a separate UI than Application 210, and therefore the user can view the history of changes in a window unassociated with Application 210. In this embodiment, when a user or Application 210 wishes to revert configuration settings from a current setting to a previous one, the user can select the event to be reverted, e.g., Title: A, Dated: May 27, 2003. The Change Log 205 can then call a reversion routine in Application 210 and pass the Package 220 to the routine. The routine can then use, e.g., the application configuration information within Package 220 for reverting to the Application's 210 previous configuration setting. Such a routine might display a link to an HTML page or call a pop-up window. The information in the Package 220 could be used to display steps a user must perform in order to revert configuration settings. In another embodiment, Application 210 uses the routine and Package 220 to automatically revert to the previous configuration setting. In any event, i.e., whether the reversion is manually or automatically performed, calling a reversion routine and passing Package 220 to it is referred herein as a callback.

There are several ways a callback for a particular application can be performed. For example, in order to support reversion, an Application 210 may need to implement a specific interface and routine specified by the interface that all reversions. This routine may in turn call other routines when reverting to a previous configuration setting using the information in Package 220, but the callback initially will be made to the specific managing routine. If Application 210 does not support this managing routine, an Error Code 215 can be raised when the callback is attempted. Alternatively, the callback routine can be encoded inside Package 220, as, for example a function pointer, callback or delegate for loading the reversion routine, with various data also encoded inside Package 220 passed as arguments.

In yet another example embodiment of the present invention, Change Log's 205 UI is supported by Application 210. As with other embodiments, Change Log 205 need not know the details of Package 220. Rather, Application 210 simply requests Package 220 back when reverting to a previous configuration setting.

In accordance with yet another example embodiment, the present invention also supports transacted configuration settings. For example, the user may wish to undo event C as shown in Change Log's 205 UI display. Event C, however, may be nested and depend from events A and B. In accordance with one embedment, when a user wishes to undo event C the system could recognize that event C cannot be undone without first undoing event A and B. Accordingly, an error code 215 can be raised and sent to the Change Log 205 telling the user that the request cannot be processed. The Change Log 205 may then notify the user of possible solutions to correct the error such as suggesting a rollback operation of A and B first. Further, the Change Log 205 may be able to determine the appropriate remedy from the Error Code 215 and automatically revert changes A and B first. This may be an iterative process, such that Change Log 205 continues to call a routine and pass Packages 220 to Application 210 until a success code is received. Alternatively, Application 210 may automatically request more Packages 220 from Change Log 205 for reverting changes A and B before reverting C, which may also be an iterative process. The present invention also provides for unifying the three nested events A, B and C and when one is desired to be reverted, the application automatically reverts all three.

As one of ordinary skill in the art would recognize, rather than sending an Error Code 215, Application 210 can also send a success code (not shown) to Change Log 205 upon a successful configuration reversion. Accordingly, Change Log 205 can note this change as part of the history for future revisions such as redoing an undo operation.

Figure 3:
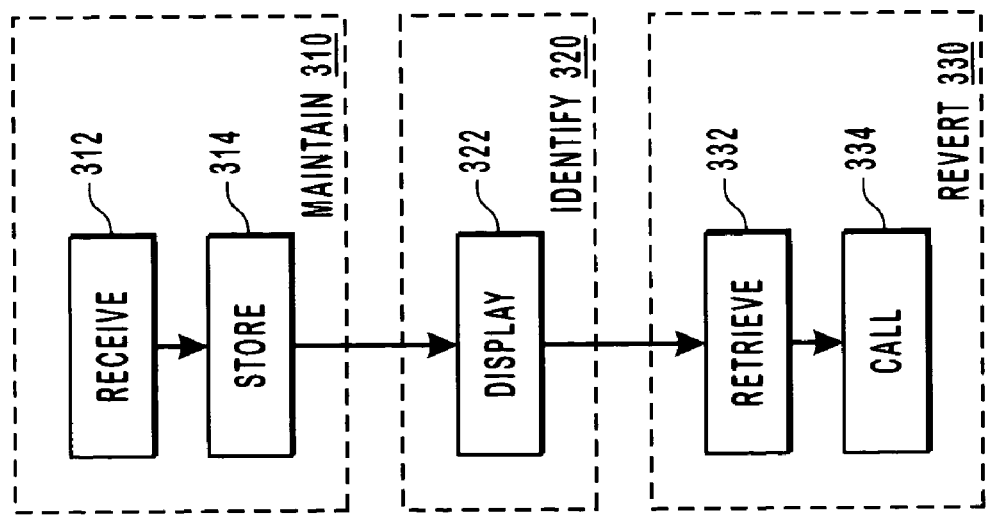
FIG. 3 illustrates example acts of and steps for methods of reverting a current configuration setting for an application to a previous configuration setting in accordance with example embodiments.

FIG. 3 illustrates example steps and acts used in reverting a current configuration setting for an application to a previous configuration setting. A step for Maintaining 310 a history of configuration setting changes for an application may include acts for Receiving 312 application configuration information and Storing 314 this information. This application configuration information is to be used in reverting to the previous configuration setting. Further, this configuration information could be Received 312 and Stored 314 as a result of a user request or automatically whenever a configuration change is made to the application.

As previously discussed, the application configuration information could be XML data comprising a header and an application portion. The header might comprise the data used in displaying a representation of the application configuration information, whereas the application portion could comprise data that will subsequently be passed to a routine for reverting to the application's previous configuration setting. Moreover, the header data used in displaying a representation of application configuration information could be a title, an application name, a description, a change date, call back identification, and/or change time.

A step for Identifying 320 application configuration information from within the maintained history may include an act of Displaying 322 a representation of the application configuration information within a UI for viewing and selecting the application configuration information. Such UI may include, e.g., a filtering device that would allow for filtering results, e.g., on a per application or per time period basis. The information displayed might then be a Name of the application whose configuration information changed, a change Title, Description, or Date and Time of the change. This information may be displayed in a grid-like fashion with rows or columns or any other suitable format. As previously mentioned, the information could be displayed for an individual application, or chronologically from a history of multiple applications.

A step for Reverting 330 to the application's previous configuration setting using a portion of the identified application configuration information may include acts of Retrieving 332 the application configuration information and Calling 334 a reversion routine. The configuration information can be passed to the routine for reverting to the application's previous configuration setting. This routine may display a link that gives the user instructions on actions or steps to perform in order to revert the application to the previous configuration settings. Alternatively, the routine may be used in automatically reverting to the application's previous configuration setting in accordance with those example embodiments described above. The reversion to the application's previous configuration setting could be an undo, redo or roll-back operation as also described above. The routine may be embedded within the header of the configuration information or the header could comprise a pointer to the reversion routine called. Further, the revision routine could call one or more other routines for reverting to the application's previous configurations setting.

Figure 4:
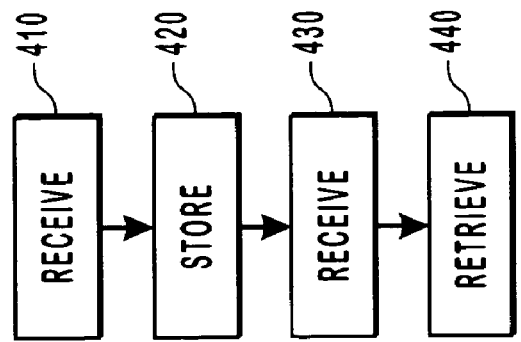
FIG. 4 illustrates example acts of a method for facilitating the reversion of an application's current configuration setting to a previous configuration setting.

FIG. 4 illustrates example acts used in facilitating the reversion of an application's current configuration setting to a previous configuration setting. The system provides for the act of Receiving 410 a package of information, which is to be used in reverting to the previous configuration setting. The package of information can then be Stored 420 for subsequent retrieval and for maintaining a history of configuration setting changes for the application. A request from the application for the package of information is Received 430 when reverting to the applications previous configuration setting. Finally, the package of information is Retrieved 440 and sent to the application for processing when reverting to the previous configuration setting.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A client may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computer system that supports one or more software applications each having one or more configuration settings which determine how a software application operates on data processed by the software application, and wherein the configuration settings of a software application are subject to change over time to change how the data is operated upon by the software application, a method of reverting a current configuration setting for a software application to a previous configuration setting so that the software application will be configured to operate on data in the same manner as the software application did with the previous configuration settings that were used by the application software, the method comprising acts of at the computer system:

based upon a request from a user or a selection from the software application, generating changes to the software application's configuration settings;

updating a configuration store by storing therein the changed application configuration settings of the software application to maintain a history of one or more configuration setting changes for the software application;

generating a package that uniquely identifies the contents of the package and the changes to the software application's configuration settings so that the package will then be later recalled and used when reverting the configuration settings of the software application back to a state that existed prior to the changes in the configuration settings;

storing the package in a software application configuration log;

displaying a graphical user interface, the graphical user interface including filtering functionality for filtering application configuration information based on a per application basis including displaying the name of one or more applications such that configuration information for a specific application can be selected;

in response to a user selection of an application from the graphical user interface, retrieving the stored package when desirable to revert the configuration settings of the software application back to a state that existed prior to the changes in the configuration settings so that the software application will be capable of operating on data in the same manner as the software application did with the previous configuration settings that were used by the application software; and using the contents of the package and the changes to the configuration settings of the software application uniquely identified by the package to revert the configuration settings back to the configuration settings that existed prior to the changes identified by the package so the software application will thereafter be configured to operate on data in the same manner as the software application did prior to such changes.

2. In a computer system that supports one or more software applications each having one or more configuration settings which determine how a software application operates on data processed by the software application, and wherein the configuration settings of a software application are subject to change over time to change how the data is operated upon by the software application, a computer readable storage media configured to provide storage within the computer system of computer executable instructions that implement a method of reverting a current configuration setting for a software application to a previous configuration setting so that the software application will be configured to operate on data in the same manner as the software application did with the previous configuration settings that were used by the application software, the method comprising acts of:

based upon a request from a user or a selection from the software application, generating changes to the software application's configuration settings;

updating a configuration store by storing therein the changed application configuration settings of the software application to maintain a history of one or more configuration setting changes for the software application;

generating a package that uniquely identifies the contents of the package and the changes to the software application's configuration settings so that the package will then be later recalled and used when reverting the configuration settings of the software application back to a state that existed prior to the changes in the configuration settings;

storing the package in a software application configuration log;

displaying a graphical user interface, the graphical user interface including filtering functionality for filtering application configuration information based on a per application basis including displaying the name of one or more applications such that configuration information for a specific application can be selected;

in response to a user selection of an application from the graphical user interface, retrieving the stored package when desirable to revert the configuration settings of the software application back to a state that existed prior to the changes in the configuration settings so that the software application will be capable of operating on data in the same manner as the software application did with the previous configuration settings that were used by the application software; and using the contents of the package and the changes to the configuration settings of the software application uniquely identified by the package to revert the configuration settings back to the configuration settings that existed prior to the changes identified by the package so the software application will thereafter configured to operate on data in the same manner as the software application did prior to such changes.

3. The method of claim 1 or 2, wherein using the contents of the package to revert the configuration settings comprises calling a reversion routine and passing at least a portion of the contents of the package to the routine, and wherein the routine displays a link that gives user instructions on procedural steps to perform in order to revert to the previous configuration setting.

4. The method of claim 3, wherein the routine automatically reverts to the application's previous configuration setting.

5. The method of claim 3, wherein the package's configuration information is XML data comprising a header portion and an application portion, wherein the header portion comprises data used in the displaying a representation of the application configuration information, and wherein the application portion comprises data that is passed to the routine for reverting to the application's previous configuration setting.

6. The method of claim 5, wherein the header data used in the displaying a representation of the application configuration information is selected from at least one of a title, application name, date or time.

7. The method of claim 5, wherein the header portion further comprises the reversion routine called.

8. The method of claim 5, wherein the header portion further comprises a pointer to the reversion routine called.

9. The method of claim 1 or 2, wherein the reversion which occurs when using the contents of the package to revert the configuration settings back to the application's previous configuration setting is one of an undo, redo or rollback operation.

10. The method of claim 1 or 2, wherein the reversion routine calls one or more other routines for reverting to the application's previous configuration setting.

11. The method of claim 1 or 2, wherein using the contents of the package to revert the configuration settings back to the configuration settings that existed prior to the changes identified by the package comprises displaying a representation of the application configuration information within one or more user interfaces for viewing and selection, and wherein at least one of the one or more user interfaces is a browser.

12. The method of claim 1, further comprising encrypting the package.

13. The method of claim 1, wherein generating changes to the software application's configuration settings is performed while the application is not being executed.

14. In a computer system that supports one or more software applications each having one or more configuration settings which determine how a software application operates on data processed by the software application, and wherein the configuration settings of a software application are subject to change over time to change how the data is operated upon by the software application, a method of reverting a current configuration setting for a software application to a previous configuration setting so that the software application will be configured to operate on data in the same manner as the software application did with the previous configuration settings that were used by the application software, the method comprising acts of at the computer system:

based upon a request from a user or a selection from the software application, generating changes to the software application's configuration settings;
  updating a configuration store by storing therein the changed application configuration settings of the software application to maintain a history of one or more configuration setting changes for the software application;
  generating a package that uniquely identifies the contents of the package and the changes to the software application's configuration settings so that the package will then be later recalled and used when reverting the configuration settings of the software application back to a state that existed prior to the changes in the configuration settings, the package comprising,
    a header portion including at least one of a title of the changes made, a name of the application software, the date and the time of the configuration changes, the header portion further comprising a reversion routine; and
    an application payload portion containing data used in assisting in reverting the software application to its previous configuration setting prior to the changes;
  storing the package in a software application configuration log which comprises,
    a log store used to store the package, and
    a user interface (UI) to browse the stored log to display the information contained in the header portion of the package so that a history of configuration changes are viewed and changes of interest are selected to use in reverting the software application to at least some of the prior configuration settings that existed prior to the changes reflected in the package;
  retrieving the stored package when desirable to revert at least some of the configuration settings of the software application back to a state that existed prior to the changes in the configuration settings so that the software application will be configured to operate on data in the same maimer as the software application did with the at least some previous configuration settings that were used by the application software;
  viewing the header portion of the package and selecting from the history of configuration changes therein at least some changes to be reverted; and
  using the contents of the package and the application payload portion thereof to revert at least the selected changes of the configuration settings back to the configuration settings that existed prior to the changes so the software application will thereafter be configured to operate on data in the same manner as the software application did prior to such changes.

15. In a computer system that supports one or more software applications each having one or more configuration settings which determine how a software application operates on data processed by the software application, and wherein the configuration settings of a software application are subject to change over time to change how the data is operated upon by the software application, a computer readable storage media configured to provide storage within the computer system of computer executable instructions that implement a method of reverting a current configuration setting for a software application to a previous configuration setting so that the software application will be configured to operate on data in the same manner as the software application did with the previous configuration settings that were used by the application software, the method comprising acts of:

based upon a request from a user or a selection from the software application, generating changes to the software application's configuration settings;
  updating a configuration store by storing therein the changed application configuration settings of the software application to maintain a history of one or more configuration setting changes for the software application;
  generating a package that uniquely identifies the contents of the package and the changes to the software application's configuration settings so that the package will then be later recalled and used when reverting the configuration settings of the software application back to a state that existed prior to the changes in the configuration settings, the package comprising,
    a header portion including at least one of a title of the changes made, a name of the application software, the date and the time of the configuration changes, the header portion further comprising a reversion routine; and
    an application payload portion containing data used in assisting in reverting the software application to its previous configuration setting prior to the changes;
  storing the package in a software application configuration log which comprises,
    a log store used to store the package, and
    a user interface (UI) to browse the stored log to display the information contained in the header portion of the package so that a history of configuration changes are viewed and changes of interest are selected to use in reverting the software application to at least some of the prior configuration settings that existed prior to the changes reflected in the package;

retrieving the stored package when desirable to revert at least some of the configuration settings of the software application back to a state that existed prior to the changes in the configuration settings so that the software application will be configured to operate on data in the same manner as the software application did with the at least some previous configuration settings that were used by the application software;

viewing the header portion of the package and selecting from the history of configuration changes therein at least some changes to be reverted; and using the contents of the package and the application payload portion thereof to revert at least the selected changes of the configuration settings back to the configuration settings that existed prior to the changes so the software application will thereafter be configured to operate on data in the same manner as the software application did prior to such changes.

16. The method of claim 14 or 15, wherein the package of information is XML data.

17. The method of claim 16, wherein the header portion further comprises a pointer to a reversion routine.

18. The method of claim 16, wherein the reversion routine calls one or more other routines for reverting to the application's previous configuration setting.

19. The method of claim 16, wherein the reversion routine displays a link that gives user instructions on procedural steps to perform in order to revert to the previous configuration setting.

20. The method of claim 16, wherein the reversion routine automatically reverts to the application's previous configuration setting.

21. The method of claim 16, wherein the reversion which occurs when using the contents of the package to revert the configuration settings back to the application's previous configuration setting is one of an undo, redo or rollback operation.

* * * * *